United States Patent [19]
Hotta et al.

[11] 4,272,750
[45] Jun. 9, 1981

[54] POWER BREAKER APPARATUS

[75] Inventors: Shigenori Hotta; Sadaaki Baba, both of Nagoya, Japan

[73] Assignee: Mitsubishi Denki Kabushiki Kaisha, Tokyo, Japan

[21] Appl. No.: 952,159

[22] Filed: Oct. 17, 1978

[30] Foreign Application Priority Data

Aug. 24, 1978 [JP] Japan .......................... 53/115979[U]

[51] Int. Cl.³ ............................................ H01H 87/00
[52] U.S. Cl. .................................... 337/1; 174/138 J; 308/244; 338/21
[58] Field of Search ................... 337/1, 4, 6, 158, 161, 337/162, 221, 273, 413; 361/10, 12, 132, 331, 332, 380; 338/21; 174/138 J; 308/164, 244; 85/50 C; 339/257, 268 R

[56] References Cited
U.S. PATENT DOCUMENTS

| 945,993 | 1/1910 | Thomson | 338/21 |
| 1,723,872 | 8/1929 | Lougee | 338/21 |
| 1,743,888 | 1/1930 | Hamister | 339/268 R |
| 2,305,577 | 12/1942 | Stoelting | 338/21 |
| 3,207,624 | 9/1965 | Burrage et al. | 338/21 |
| 3,742,247 | 6/1973 | Sunstein | 361/10 |
| 3,956,672 | 5/1976 | Dumas | 361/331 |

Primary Examiner—William H. Beha, Jr.
Attorney, Agent, or Firm—Oblon, Fisher, Spivak, McClelland & Maier

[57] ABSTRACT

A power breaker apparatus comprises a permanent fuse and resistors connected in parallel to the permanent fuse through a connecting conductor and is connected between a power source and a load to break a current supply to the load when a fault current is passed. At least external surfaces of the parallel resistors near the connecting parts of the connecting conductor are coated by an insulating coat.

5 Claims, 4 Drawing Figures

POWER BREAKER APPARATUS

BACKGROUND OF THE INVENTION

The present invention relates to a power breaker apparatus which quickly detects an abnormal current to break a power supply to a load when the abnormal current is fed by a short-circuit of the load.

As shown in FIG. 1, the conventional power breaker apparatus comprises a permanent fuse PF and resistors R connected in parallel to the fuse which are connected between a short time delaying main breaker B and a plurality of shunt breakers $F_1$ to $F_n$.

The permanent fuse PF suddenly increases its resistance when fault current is passed. The relation of a resistance $R_{PF}$ of the conventional permanent fuse PF and the parallel resistance R is $R_{PF} < R$ whereby the ratio is controlled to pass all of the current through the permanent fuse PF in the normal state.

For example, when a short-circuit is caused in the circuit of the shunt load $F_1$, the fault current is passed through the permanent fuse PF to increase suddenly the inner resistance of the permanent fuse to be several hundreds times to the initial resistance whereby the fault current is reduced and the limiting current is fed through the parallel resistor R to the shunt breakers $F_1$ and accordingly, the shunt breaker $F_1$ is actuated.

FIG. 2 shows the current limiting condition of the fault current. When the fault current $I_{pros}$ is fed, the inner resistance of the permanent fuse PF is suddenly increased to perform the current limiting operation to control the peak value of the current to $I_{pfc}$. The resistance of the permanent fuse PF is greater than the parallel resistance R whereby the fault current $I_{pfr}$ is continuously passed through the permanent fuse PF and the resistor R to operate the shunt breaker $F_1$.

The conventional power breaker apparatus has the above-mentioned structure and the presumed short-circuit current maximum peak value $I_c$ is limited to the current limiting maximum peak value $I_{pfc}$ resulted by the permanent fuse PF. However, at the current limiting operation, there is a problem which causes an abnormal voltage between the parallel resistor R and the connecting conductor so as to damage the parallel resistors by arcing.

SUMMARY OF THE INVENTION

It is an object of the present invention to provide a power breaker apparatus which prevents arcing by coating at least both ends of the parallel resistors with an insulating coat so as to overcome the above-mentioned disadvantages.

The present invention is to provide a power breaker apparatus which comprises a permanent fuse and resistors connected in parallel to the permanent fuse through a connecting conductor, and which is connected between a power source and a load to break a current supply to the load when a fault current is passed, wherein at least external surfaces of the parallel resistors near the connecting part of the connecting conductor are coated by an insulating coat.

DETAILED DESCRIPTION OF THE PREFERRED EMBODIMENTS

One embodiment of the power breaker apparatus of the present invention will be illustrated.

Figure 3:
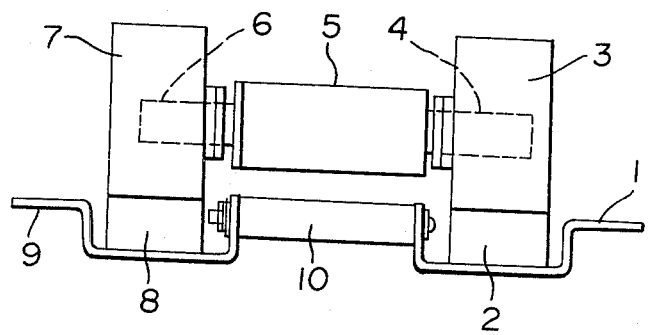
FIG. 3 is a schematic view of the power breaker apparatus.

In FIG. 3, the reference numeral (1) designates a conductor in the power source side; (2) designates a connecting conductor; (3) designates heat radiation fins; (4) designates a current terminal for a permanent fuse; (5) designates a permanent fuse; (6) designates a current terminal of the permanent fuse; (7) designates heat radiation fins; (8) designates a connecting conductor; (9) designates a conductor in the load side and (10) designates a parallel resistor.

Figure 4:
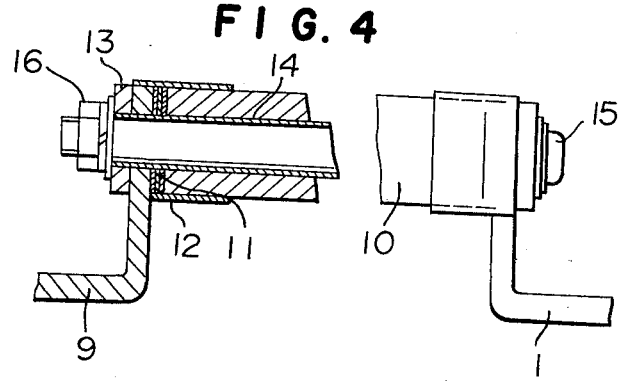
FIG. 4 is a partially broken view of a parallel resistor connected in the power breaker apparatus of the present invention.

Referring to FIG. 4, the structure of the parallel resistor (10) is described in detail.

The reference numeral (11) designates a spacer which is preferably a copper spacer having suitable thickness or being formed by piling up suitable sheets of thin plates and which is disposed between the parallel resistor (10) and the conductor (1) in the power source side and between the parallel resistor (10) and the conductor (9) in the load side. The spacer is fastened by a clamp screw (15) and a nut (16).

An insulating tube (14) and an insulating washer (13) are disposed on the external part of the clamp screw (15) so as to give only the resistance of the parallel resistor (10) between the conductor (1) in the power source side and the conductor (9) in the load side. As the result, the clamp screw (15) and the nut (16) are completely insulated from the charging part. Moreover, both of the ends of the parallel resistor (10) are coated with an insulating coat (12) such as a silicone tape.

In said structure, the current supply in the normal state is fed from the conductor (1) in the power source side, through the connecting conductor (2), the permanent fuse current terminal (4) and the permanent fuse (5), the current terminal (6) in the reverse side, the connecting conductor (8) to the conductor (9) in the load side.

In the normal state, the resistance of the parallel resistor (10) is several hundreds times to the inner resistance of the permanent fuse (5) whereby the current is not passed through the parallel resistor (10).

Figure 1:
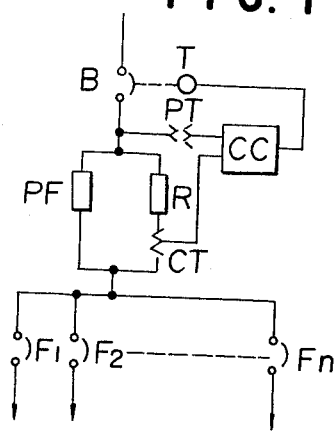
FIG. 1 is a circuit diagram of an electric system of a power breaker apparatus.
Figure 2:
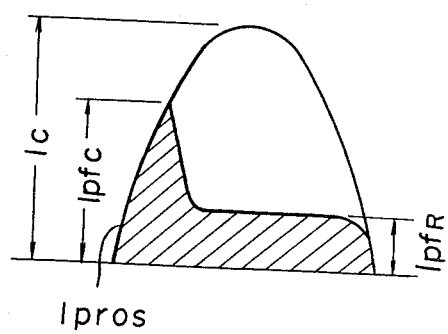
FIG. 2 is a graph of current limiting characteristics by a permanent fuse.

If a short-circuit is caused in the shunt load, the short-circuit fault current $I_{pros}$ shown in FIG. 2 is passed. The inner element of the permanent fuse PF causes phase conversion as solid-liquid-gas by the heating caused by the fault current whereby the current limiting operation is performed because of significant high resistance.

The current limiting peak value given by the permanent fuse is limited to $I_{pfc}$ shown in FIG. 2.

Thus, the resistance of the permanent fuse (5) is higher than the resistance of the parallel resistor (10) whereby the fault current $I_{pfc}$ is continuously passed through the parallel resistor (10) and the permanent fuse (5).

During the current limiting operation, overvoltage $E_{fm}$ is generated.

$$E_{fm} = I_{pfc} \cdot R$$

wherein $I_{pfc}$ designates the current limiting peak value and R designates the resistance of the parallel resistor.

The overvoltage $E_{fm}$ is significantly increased when the short-circuit current is increased such as 200 KA, whereby there is a possibility arcing between the parallel resistor (10) and the connecting conductor (1) or the connecting conductor (9) or near the surfaces of ends of the parallel resistor (10). However, in accordance with the present invention, the arcing is not caused because the insulating coat is provided on the parallel resistor (10).

In said embodiment, the insulating coat (12) is provided only on both of the ends of the parallel resistor (10). Thus, it is possible to provide the insulating coating on all surface of the parallel resistor (10).

The connecting conductors (1), (9) are rigidly fixed in a box frame in which the power breaker apparatus is included. The angle of L-shape part is not always constant, because of processing errors and accordingly, there is a possibility that the distance between both of the conductors (1), (9) is not always constant and a space is formed between the conductor and the parallel resistor (10) or the conductor is contacted in slant with the end surface of the parallel resistor (10) to cause a point contacting condition instead of the surface contacting condition.

However, in accordance with the present invention, a conductive spacer (11) is provided whereby the parallel resistor (10) is always contacted with the connecting conductors (1), (9) in a surface contacting condition so as to prevent the arcing between them by forming a gap between them.

As described above, the parallel resistor of the power breaker apparatus of the present invention is improved to prevent the arcing whereby the power breaking can be perfectly attained to increase significantly the capacity for breaking, even though large short-circuit current such as 200 KA is passed.

What is claimed is:

1. A power breaker apparatus comprising a permanent fuse and at least one resistor connected in parallel to said permanent fuse through a connecting conductor having a pair of terminals, and being connected between a power source and a load current supply to break said current supply to said load when a fault current is passed, wherein said at least one resistor comprises:
    a resistor element, said resistor element having two ends, one of said ends adjacent each of said terminals;
    an insulating coating material coating each of said ends;
    means for securing each of said ends to a respective terminal, said securing means being electrically insulated from said resistor element and said pair of terminals; and
    easily deformable conductive spacing means between each of said ends and said respective terminal;
    wherein said insulative coating material covers said conductive spacing means,
    whereby said conductive spacing means is deformed by the securement of each of said ends to said respective terminal so as to ensure electrical contact therebetween.

2. The apparatus of claim 1 wherein said conductive spacing means is at least one copper plate.

3. The power breaker apparatus of claim 2, wherein said resistor element is formed of a cohesive unit.

4. A power breaker apparatus according to claim 1 wherein the insulating coat is an insulating tape.

5. A power breaker apparatus according to claim 1 or 2 wherein the insulating coat is provided on all of the external surfaces of the resistors.

* * * * *